Dec. 10, 1929.  G. P. ENGLISH ET AL  1,738,949
LIQUID LEVEL INDICATOR
Filed Nov. 9, 1922
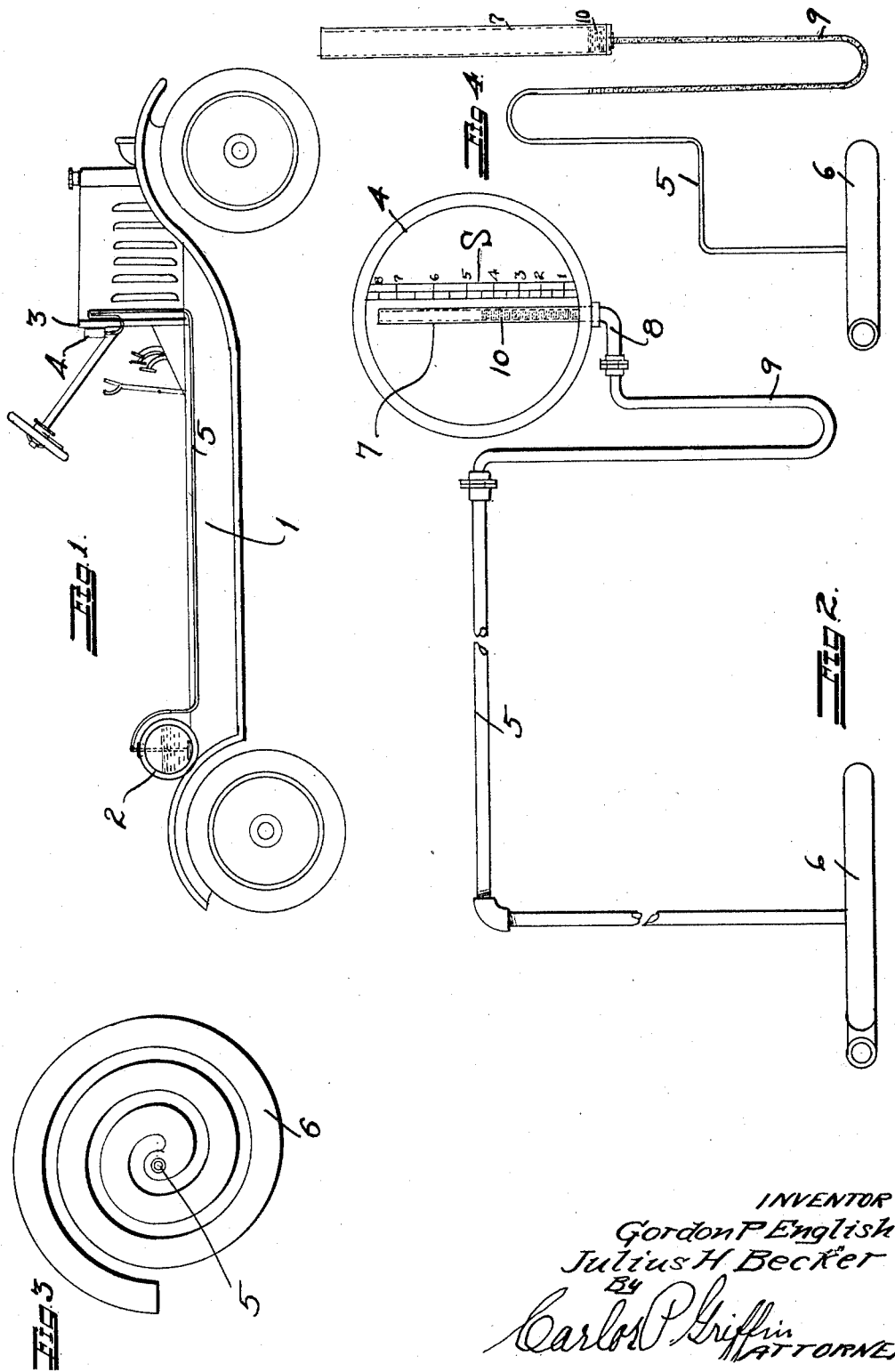
INVENTOR
Gordon P English
Julius H Becker
BY
Carlos P Griffin
ATTORNEY Patented Dec. 10, 1929

1,738,949

UNITED STATES PATENT OFFICE

GORDON P. ENGLISH AND JULIUS H. BECKER, OF SAN FRANCISCO, CALIFORNIA, ASSIGNORS, BY MESNE ASSIGNMENTS, TO AMERICAN RESEARCH AND DEVELOPMENT COMPANY, A CORPORATION OF DELAWARE

LIQUID-LEVEL INDICATOR

Application filed November 9, 1922. Serial No. 599,822.

This invention relates to a gauge for ascertaining the depth of liquid, usually either gasoline, water or oil, in a tank, and its object is to provide means for compensating the air column contained within the pipe extending from the tank to the indicator in such a way as to prevent changes of temperature from causing errors in the desired indication.

Another object of the invention is to produce an indicating gauge which is simply and easily installed upon any character of tank.

It will be understood by those skilled in the art that one of the principal uses of such gauges as are here disclosed, is in connection with indicating the quantity of gasoline in the tank of an automobile.

Another object of the invention is to provide a gauge which is capable of having its indicator installed at a considerable distance from the tank, either above or below the same as may be convenient.

Another object of the present invention is to produce a compensating device of such a nature as to permit it to be readily inserted in a small opening in the tank, thereby making it unnecessary to cut a large hole in the tank.

Other objects of the invention will appear as the description proceeds.

An embodiment of the invention is shown in the accompanying drawings in which the same reference numeral is applied to the same portion throughout, but we are aware that there may be modifications thereof.

Fig. 1 is a side elevation of an automobile chassis having its indicating gauge thereon used in connection with a tank at the rear of the vehicle frame, Fig. 2 is a side elevation of the pipe system used including a front elevation of the indicator dial, Fig. 3 is a plan view of the compensator which is adapted to be placed in the liquid near the bottom of the tank, Fig. 4 is a diagrammatic view illustrating the difference in size between the pipe leading from the compensator to the indicator dial.

The numeral 1 indicates the automobile frame which has a tank 2 at the rear.

On the dashboard 3 there is mounted the indicator dial 4, near which an open glass gauge tube 7 is supported. This tube encloses a column 10 of indicating liquid, and its lower end communicates with a pipe 5 extending to tank 2.

The pipe 5 is a comparatively small pipe with an opening of not more than a sixteenth of an inch in diameter. This pipe in turn communicates with a horizontal spiral tube 6. This tube has its turns spaced apart sufficiently to permit it to be inserted in the fuel tank by springing it slightly and then rotating it to screw it through a hole in the top of tank 2.

The dial 4 is provided with a scale S which is positioned adjacent the indicating tube 7 and is graduated in terms of depth or quantity of liquid in the tank.

Observing Fig. 1, it will be noted that the spiral 6, at the bottom of the tank, has its coil in substantially a horizontal plane. It will be also noted that the spiral 6 and tube 7 are larger than the interior area of the pipe 5, the object of this, with respect to the spiral 6, is to retain within it a sufficient quantity of air to make it certain that none of the liquid passing into the spiral will pass through it into the pipe 5. The spiral 6, tube 5, and U-tube 9 form thus a connected passageway that serves as a trap for air or other gas to transmit the pressure due to the height of the liquid in tank 2, to the liquid column 10 in gage glass 7.

In the case of the tube 7 it is made larger than the pipe 5 in order to give a reading within the compass of size of the dial 4 regardless of the depth of the tank, it being understood, of course, that moderate depths only are to be measured, that is, any depth under 32' of water. By increasing the size of the pipe 7 with respect to the U-shaped portion of the tube 5 a considerable change in level of the liquid in the tube 5 will make a comparatively small difference in the change of level in the liquid in the tube 7. The object of this is to provide means whereby, within the scope of a dial, say 3" in diameter, to readily ascertain the number of gallons or depth in inches in a tank a foot or two in depth without having the liquid in the tube 7 move as much as the change in elevation of the liquid in the tank. Experiment shows that this gauge operates correctly whether the machine is inclined sideways or inclined forward or back and that wide changes in the air temperature do not affect it.

It will be understood that with the present compensator that wide variations in temperature will not affect the indicator because under normal operating conditions and within the operative range of the instrument, the liquid passing into the spiral 6 does not reach the pipe 5 and therefore its relative elevation is never changed so that any change in pressure within the tube 5 merely pushes some of the liquid within the spiral tube 6 out or else, if the pressure is lowered, liquid passes a little further into the spiral 6.

Consequently there is no vertical displacement of the liquid in the tube and the pressure produced at the gauge is always equal to the pressure produced by the head of liquid in the tank. The horizontal tube, which may for the purpose of convenience be coiled in a spiral, has sufficient internal volume, with relation to the internal volume of the connecting pipe, that regardless of temperature and barometric conditions and the amount of liquid in the tank, the liquid does not reach the vertical connecting pipe, so that there is no vertical displacement of the liquid in the connecting tube. Should the liquid rise in the vertical tube, the accuracy of the instrument is immediately destroyed, since the gauge will then indicate the difference in level of the liquid in the tank and in the tube and will not indicate the depth of the liquid in the tank. Since gasoline gauges are useful principally to indicate the gasoline supply when such supply is running low, it is evident that an instrument which would show a two gallon error at that time would be worse than no gauge at all, since it would give the driver a false security. The diameter of the tube 6 is such that the liquid is displaced horizontally therein and not vertically and for that purpose the tube is of small diameter so that the capillary action of the liquid causes the liquid to move in the tube in an unbroken column.

What we claim is as follows, but various modifications may be made in the construction shown in the drawings and above particularly described form, within the purview of our invention:

1. In a device for indicating the quantity of liquid in a container, said device being arranged to operate by virtue of variations in pressure exerted by the liquid at a fixed point in the container, an indicator responsive to pressure, and means for transmitting the pressure from the liquid to the indicator, comprising a trap enclosing a fluid having negligible weight which serves as the pressure transmitting medium, said trap having means for ensuring that the liquid will exert its pressure on the fluid at a constant level, comprising a conduit forming a horizontal extension to the trap and communicating with the container at said constant level, said conduit having a substantial volume and a cross section of such area that the liquid moves only in a horizontal direction therein and presents a contact surface to the fluid which is not horizontal, and within the range of operation of the device is always confined to the conduit only.

2. A device for indicating the quantity of liquid in a container, arranged to operate by virtue of variations in pressure exerted by the liquid at a fixed point in the container, said device having an indicator responsive to pressure, and a connection between the container and the indicator for transmitting the pressure exerted by the liquid to the indicator, said connection comprising a trap enclosing a fluid of negligible weight which serves as the pressure transmitting medium, characterized by the fact that said trap includes an extension to the liquid that is horizontal, this horizontal extension having a cross section of such area that the liquid moves only in a horizontal direction therein, and a volume sufficient to maintain a non-horizontal contact surface between the fluid and the liquid always in said extension, within the operative range of the instrument, irrespective of variations in volume of the fluid.

3. In a device for indicating the quantity of liquid in a container, said device being arranged to operate by virtue of variations in pressure exerted by the liquid at a fixed point in the container, an indicator responsive to pressure, and means for transmitting the pressure from the liquid to the indicator, said means comprising a trap enclosing a fluid of negligible weight which serves as the pressure transmitting medium, said trap having means for preventing variations in the volume of the fluid from producing an error in the indications, comprising means for ensuring that the contact surface between the liquid and the fluid travels only in a horizontal direction within the operative range of the device as the fluid contracts and expands.

4. In a gasoline gauge for an automobile gasoline tank, an indicator responsive to pressure and adapted to be supported at a point remote from the tank, a tube enclosing a constant mass of gas and connected between the indicator and the tank, in such manner that the enclosed gas transmits the pressure exerted by the gasoline in the tank, the pressure varying with variations in the level of the gasoline, and means for ensuring that variations in the volume of the gas will not produce an error in the reading of the indicator, comprising a horizontal conduit having a cross section of such area that the liquid moves in a horizontal direction therein, and connected in series with said tube, the cross section of said conduit being such that the contact surface between the gasoline and the gas is not horizontal and travels only in said conduit within the operative range of the device, upon variations in gas volume.

5. In combination with a liquid receptacle, a depth measuring apparatus comprising a pressure indicating device and a conduit, said conduit being operatively connected to said device and extending to and into said receptacle and having an open end at a point adjacent the low liquid level therein, said conduit including a substantially horizontally arranged coil adjacent the low liquid level of said receptacle, said coil being of relatively small internal cross sectional area whereby liquid entering the same forms a meniscus to normally prevent the liquid in the conduit from flowing past the air therein.

In testimony whereof we have hereunto set our hands this 3rd day of November, A. D. 1922.

GORDON P. ENGLISH.
JULIUS H. BECKER.